United States Patent [19]

Jong

[11] Patent Number: 5,643,489

[45] Date of Patent: Jul. 1, 1997

[54] MANUFACTURING METHOD OF FAR INFRARED RAY EMITTING MATERIAL AND FAR INFRARED RAY EMITTING PRODUCT USING THE SAME

[76] Inventor: Sung-Jun Jong, 343-13, Namjeong-li, Shindun-myeon, Leecheon-kun, Kyungki-do, DPR of Korea

[21] Appl. No.: 455,346

[22] Filed: May 31, 1995

[30] Foreign Application Priority Data

Feb. 14, 1995 [KP] DPR of Korea .................. 95-2703

[51] Int. Cl.$^6$ ................................................ G03C 3/064

[52] U.S. Cl. .................. 252/1; 501/21; 501/63; 501/65; 501/67; 501/904; 65/134.1; 65/134.3; 65/135.9; 65/136.4

[58] Field of Search ................ 252/1; 501/21, 501/63, 65, 67, 904; 65/134.1, 134.3, 135.9, 136.4

[56] References Cited

U.S. PATENT DOCUMENTS

| | | | |
|---|---|---|---|
| 3,635,739 | 1/1972 | MacDowell et al. | 501/10 |
| 3,698,921 | 10/1972 | Grouw et al. | 501/66 |
| 3,837,867 | 9/1974 | Dumbaugh, Jr. | 501/41 |
| 3,837,868 | 9/1974 | Berleue et al. | 501/41 |
| 3,944,329 | 3/1976 | Lee, Jr. et al. | 252/583 |
| 3,982,952 | 9/1976 | Dumbaugh, Jr. | 501/42 |
| 3,997,312 | 12/1976 | Besselink | 65/30.13 |
| 4,009,042 | 2/1977 | Rittler | 501/4 |
| 4,032,351 | 6/1977 | Auzel et al. | 501/3 |
| 4,396,720 | 8/1983 | Beall et al. | 501/5 |
| 4,479,819 | 10/1984 | Borelli et al. | 65/30.11 |
| 4,519,828 | 5/1985 | Beall et al. | 65/33.7 |
| 4,908,054 | 3/1990 | Jones et al. | 65/30.11 |
| 5,121,748 | 6/1992 | Ditz et al. | 128/631 |
| 5,173,212 | 12/1992 | Speit et al. | 252/301.4 P |

OTHER PUBLICATIONS

CN 1087374 A (Jun. 01, 1994) as Abstracted by Chemical Abstracts HCAPLUS:1995:742951.
CN 1084839 A (Apr. 06, 1996) as Abstracted by Chemical Abstracts HCAPLUS 1995:615351.
JP 06233218 A2 (Aug. 19, 1994) as abstracted by Chemical Abstracts. HCPLUS 1995:471788 (Aug. 19, 1994) as abstracted by Chemical Abstracts.
CN 1081430 A (Feb. 02, 1994) as abstracted by Chemial abstracts HCAPLUS 1995:347158.
J. High Temp. Chem. Processess (1994) vol. 3, No. 2, pp. 213-219 HCAPLUS 1995:295182.
JP 02120266 A2 (May 08, 1990) as abstracted by HCAPLUS 1991:29131.
JP 01101874 A2 (Apr. 19, 1989) as abstracted by HCAPLUS 1990:54066.
JP 57056348 A2 (Apr. 03, 1982) as abstracted by HCAPLUS 1982:477535.
JP 57055085 A2 (Apr. 01, 1982) as abstracted by HCAPLUS 1982:477485.
JP 56156773 A2 (Dec. 03, 1981) as abstracted by HCAPLUS 1982:128427.
JP 05301788 A (Apr. 27, 1992) as abstracted by JAPIO 93-301788.
JP 05140505 A (Jun. 08, 1993) as abstracted by Japio 93-140505.
JP 02180835 (Jul. 13, 1990) as abstracted by Japio 90-180835.
JP 02133717 A (May 22, 1990) as abstracted by Japio 90-133717.
JP-01077612 A (Mar. 23, 1989) as abstracted by Japio 89-077612.
JP-63195372 A (Aug. 12, 1988) as abstracted by Japio 88-195372.
JP 61250423 Nov. 07, 1986 (As abstracted by Japio 86-250423).
JP 61081440A (Apr. 25, 1986) As abstracted by Japio 86-081440.
JP 56012950 A (Feb. 07, 1981) As abstracted by Japio 81-012950.

*Primary Examiner*—Sharon Gibson
*Assistant Examiner*—Valerie Fee
*Attorney, Agent, or Firm*—Richard C. Woodbridge

[57] ABSTRACT

The present invention relates to a manufacturing method of a far infrared ray emitting material having a wavelength of predetermined frequency band and a far infrared ray emitting product using the same, the manufacturing method including steps of: having a mixing vessel containing a predetermined quantity of materials agitated for 0.5–1 hour by a stirrer having a rotative speed of 33 revolution per minute and mixied; and the materials being thrown into a glass dissolving furnace of 1,350–1,550 degrees celsius and fused for 19–21 hours, whereby the predetermined quantity of materials is constituted by silicon oxide of 45–65 weight %, felspar oxide of 7–9 weight %, borax of 10–20 weight %, boric acid of 4–6 weight %, potassium carbonate of 2–4 weight %, nite of 1.0–1.2 weight %, aluminum hydroxide of 3.3–6.8 weight %, limestone of 1.4–1.8 weight %, barium carbonate of 0.8–1.0 weight %, lithium of 0.7–0.8 weight %, zircon of 1.0–1.3 weight %, phosphoric acid of 0.2–0.4 weight %, carbon of 3.0–3.5 weight %, magnesium carbonate of 0.4–0.5 weight % and color fixing agent of 0.2–0.22 weight %.

5 Claims, No Drawings

MANUFACTURING METHOD OF FAR INFRARED RAY EMITTING MATERIAL AND FAR INFRARED RAY EMITTING PRODUCT USING THE SAME

BACKGROUND OF THE INVENTION

1. Field of the Invention

The present invention relates to a far infrared ray emitting material, and more particularly to a manufacturing method of a far infrared ray emitting material having a wave length of a predetermined frequency band and a far infrared ray emitting product using the same.

2. Description of the Prior Art

Since the first discovery of the infrared ray by a German physicist, F. W. Herchi, Schfanck of Germany, et al., has started to industrially use the infrared ray on a porous ceramic burner and the like.

Recently, it has been known that all brasswares emit to some degrees the infrared ray having a predetermined wavelength, in other words, the far infrared ray.

The far infrared ray is a vibrating wave of electromagnetic force line generated according to molecular movement in the far infrared ray emitting material, and a generated form thereof comes in a cold emitting, hot emitting and the like.

The far infrared ray is in substance a kind of electromagnetic wave so that it reflects when it hits an object.

According to the theory thus described, various attempts have been made recently to utilize the same industrially by generating stably the far infrared ray having a predetermined period.

SUMMARY OF THE INVENTION

Accordingly, the present invention is disclosed to utilize the far infrared ray for industrial purposes, and it is an object of the present invention to provide a manufacturing method of far infrared ray emitting material and a far infrared ray emitting product using the same by which water quality can be improved.

It is another object of the present invention to provide a manufacturing method of far infrared ray emitting material and a far infrared ray emitting product using the same by which odor of a foot, odor generating from liquid substance or the like can be removed according to a strong vibration of the far infrared ray.

It is a further object of the present invention to provide a manufacturing method of far infrared ray emitting material and a far infrared ray emitting product using the same by which flavor of coffee can be deepened whereby caffein component contained in the coffee can be reduced.

It is a still further object of the present invention to provide a manufacturing method of far infrared ray emitting material and a far infrared ray emitting product using the same by which nicotine ingredient contained in cigarette can be disintegrated.

In accordance with one aspect of the present invention, there is provided a manufacturing method of far infrared ray emitting material, the method comprising steps of: having a glass vessel or a stainless steel vessel containing a predetermined quantity of materials agitated for 0.5–1 hour by a stirrer having a rotative speed of 33 revolution per minute (rpm) and mixed; and the materials being thrown into a glass dissolving furnace of 1,350–1,550 degrees celsius and fused for 19–21 hours whereby the predetermined quantity of materials is constituted by silicon oxide of 45–65 weight %, felspar oxide of 7–9 weight %, borax of 10–20 weight %, boric acid of 5–6 weight %, potassium carbonate of 3–4 weight %, nitre of 1–1.2 weight %, aluminum hydroxide of 6.3–6.8 weight %, limestone of 1.4–1.8 weight %, barium carbonate of 0.8–1 weight %, lithium of 0.7–0.8 weight %, zircon of 1–1.3 weight %, phosphoric acid of 0.2–0.4 weight %, carbon of 3–3.5 weight %, magnesium carbonate of 0.4–0.5 weight % and a color fixing agent of 0.2–0.22 weight %.

In accordance with another aspect of the present invention, there is provided a far infrared ray emitting product using the far infrared ray emitting material, the product comprising a predetermined quantity of materials for being inserted into a mixing vessel, agitated for 0.5–1 hour by a stirrer having a rotative speed of 33 rpm to thereby be mixed, thrown into a glass dissolving furnace of 1,350–1,550 degrees celsius, and fused for 19–21 hours, whereby the predetermined quantity of materials is constituted by silicon oxide of 45–65 weight %, felspar oxide of 7–9 weight %, borax of 10–20 weight %, boric acid of 4–6 weight %, potassium carbonate of 2–4 weight %, nitre of 1.0–1.2 weight %, aluminum hydroxide of 3.3–6.8 weight %, limestone of 1.4–1.8 weight %, barium carbonate of 0.8–1.0 weight %, lithium of 0.7–0.8 weight %, zircon of 1.0–1.3 weight %, phosphoric acid of 0.2–0.4 weight %, carbon of 3.0–3.5 weight %, magnesium carbonate of 0.4–0.5 weight %, and color fixing agent of 0.2–0.22 weight %, the far infrared ray emitting material now being pulverized, added by synthetic resin or silicon rubber and the pulverized far infrared ray emitting material in the ratio of 1,000 grams and 150 grams, formed and extruded.

DETAILED DESCRIPTION OF THE INVENTION

The inventor has manufactured the far infrared ray emitting material in the following processes.

A mixing vessel is provided with a predetermined quantity of materials which is agitated by a stirrer of 33 rpm for 0.5–1 hour to thereafter be mixed thereamong, put into a glass dissolving furnace of 1,350–1,550 degrees celsius, fused for 19–21 hours to thereby obtain the far infrared ray emitting material, whereby the predetermined quantity of materials is constituted by silicon oxide of 45–65 weight %, felspar oxide of 7–9 weight %, borax of 10–20 weight %, boric acid of 4–6 weight %, potassium carbonate of 2–4 weight %, nitre of 1.0–1.2 weight %, aluminum hydroxide of 3.3–6.8 weight %, limestone of 1.4–1.8 weight %, barium carbonate of 0.8–1.0 weight %, lithium of 0.7–0.8 weight %, zircon of 1.0–1.3 weight %, phosphoric acid of 0.2–0.4 weight %, carbon of 3.0–3.5 weight %, magnesium carbonate of 0.4–0.5 weight %, and color fixing agent of 0.2–0.22 weight %.

The far infrared ray emitting material is now poured into a mold to thereby obtain a far infrared ray emitting product having a thickness of 5 mm–10 mm with a diameter of 50 mm–70 mm.

In the aforesiad description, when the materials are added by borax of 20 or more weight %, a soluble time can be shortened but they can be vulnerable to heat resistance. When the materials are added by borax of less than 10 weight %, the soluble time is lengthened. When the carbon of less than 3 weight % is added, an emitted quantity of the far infrared ray is unadvisably small.

Cobalt oxide has a property of inhibiting X-ray and has a property of absorbing and permeating the infrared ray. Phosphoric acid has a property of forming a crystal, so if added quantity of the same is not properly regulated, there is a disadvantage in that wavelength of the far infrared ray emitted from the far infrared ray emitting material comes under 0.26 μm, thereby decreasing the power of water quality improvement, and weakening the capability of odor removal, caffeine disintegration and nicotine component removal of a cigarette.

The far infrared ray emitting material thus manufactured tends to have various colors, and emits the far infrared ray have a wavelength of 0.26–1,000 μm. In this case, degree of permeation is 85–87%.

Furthermore, color fixing agents used for manufacturing the far infrared ray emitting material include copper oxide, cabalt oxide, manganese dioxide, and nickel oxide. When the manganese dioxide and nickel oxide are used as color fixing agents, a black far infrared ray emitting material can be manufactured, and when copper oxide of 0.1 weight %, and manganese dioxide of 0.1–0.12 weight %, are used, a cobaltic far infrared ray emitting material is produced.

When no color fixing agent is used at all, a transparent far infrared ray emitting material is manufactured.

A disc-shaped far infrared ray emitting product manufactured by using the far infrared ray emitting material according to the present invention has an opaque or clear transparency and can comes in various colors, and emits a far infrared ray having a wavelength of 0.26–1,000 μm, and when the same is applied to an affect part of a human body, blood circulation is promoted to thereby promote a remedial value, and at the same time, when the same is applied for a long time to an affected part where fungus has developed at a foot or to an affected area where bad odor is generated, blood circulation is quickened from the far infrared ray emitting material, thereby obtaining a remarkably remedial value.

Furthermore, when the far infrared ray emitting material (or product) according to the present invention is dipped into a cup when coffee is contained for one to five minutes, a molecular arrangement in caffeine components are changed by the far infrared ray, to thereby remove the caffeine components and to strengthen or deepen coffee flavor.

When the cigarette or the like is placed on the far infrared ray emitting material (or product) for one to five minutes, a molecular arrangement in the nicotine ingredients contained in the cigarette is changed (PH increases from 7 to 7.5) to disintegrate the nicotine ingredients for the improvement of a smoker's health.

The far infrared ray emitting material (or product) according to the present invention has an outstanding utility value in medical and industrial fields.

Next, a predetermined quantity of materials is put into a mixing vessel, agitated for 0.5–1 hour by a stirrer of 33 rpm for mixing thereof, thrown into a glass dissolving furnace of 1,350–1,550 degrees celsius for 19–21 hours for fusing thereof, to thereby manufacture a far infrared ray emitting material, whereby the predetermined quantity of materials contains silicon oxide of 45–65 weight %, felspar oxide of 7–9 weight %, borax of 10–20 weight %, boric acid of 4–6 weight %, potassium carbonate of 2–4 weight %, nitre of 1.0–1.2 weight %, aluminum hydroxide of 3.3–6.8 weight %, limestone of 1.4–1.8 weight %, barium carbonate of 0.8–1.0 weight %, lithium of 0.7–0.8 weight %, zircon of 1.0–1.3 weight %, phosphoric acid of 0.2–0.4 weight %, carbon of 3.0–3.5 weight %, magnesium carbonate of 0.4–0.5 weight %, and color fixing agent of 0.2–0.22 weight %.

The far infrared ray emitting material thus manufactured is inserted into a cold water, so that the disintegrated glass phase of grains can be finely ground.

Next, synthetic resin or silicon rubber of 100 grams and powdered far infrared ray emitting material of 150 grams are mixed to produce a disc-shaped far infrared ray emitting product having a thickness of 5 mm and a radius of 30 mm from an extruder.

In the aforesaid description, when borax of 20 or more weight % is added, a soluble time thereof can be shortened but a resistance to the heat can be weakened.

When the borax of less than 10 weight % is added, the soluble time thereof is lengthened. When the carbon of less than 3 weight % is added, the emitted quantity of the far infrared ray is unadvisably small.

The cobalt oxide has a property in that it can cut off an X-ray, absorb and pass through the infrared ray, and the phosphoric acid has a property in that it can form a crystal, so that, if an appropriate quantity of the same is not added, the wavelength of the far infrared ray emitted from the far infrared ray emitting material comes to be below 0.26 μm. The capability thereof for reducing odor and disintegrating the caffeine and nicotine ingredient in the cigarette is unadvisably weakened.

Because the far infrared ray emitting material thus manufactured contains resin, it is resilient, light and has various colors of opaqueness. It also emits the far infrared ray having a wavelength band of 0.26–1,000 μm, so that, if it is applied to an affected area of a human body, blood circulation is promoted and remedial value against the affected area of the body is increased.

Furthermore, when the far infrared emitting material according to the present invention is attached for a long time to the human foot or to an area where bad odor is generated due to the human foot, the blood circulation is promoted by the far infrared ray emitted from the far infrared ray emitting material to theeby cure the athlete's foot.

When the far infrared ray emitting material is dipped into a cup containing coffee for one to five minutes, the caffeine ingredients are destroyed to thereby obtain a deep-flavored coffee, because caffeine protective membrane is disintegrated and molecular arrangement of the caffeine is changed by the far infrared ray in the processes of conduction, convection and radiation.

Meanwhile, the far infrared ray emitting material (or product) according to the present invention has an outstanding utility value in the medical and industrial fields especially in that a smoker can maintain a good healthy life if he or she smokes a cigarette or the like placed for one to five minutes on the far infrared ray emitting material (or product), bacause the nicotine component contained in the cigarette increases in PH from 7 to 7.5, to thereby change the molecular arrangement (the nicotine component to be alkalized) and to disintegrate the nicotine component in the cigarette.

Resins used for manufacturing the far infrared ray emitting product according to the present invention includes, by way of exmple, phenol resin, puran resin, urea resin, melamin resin, unsaturated polyster, diarylphtalate resin, epoxy resin, polyurethane, silicon resin, polymide, vinyl chloride resin, vinyliden chloride resin, vinyl acetate resin, polyvinyl alcohol, polyvinyl acetal, polystyrene, As resin, ABS resin, metacryl resin, ester acetate resin, polyethylene, polypropylene, fluorine resin, polyamide, polyacetal, polycarbonate, saturated polyester, polyphenylene oxide system resin, polysulfone, polyetersulfone, polyphenylene sulfide, cellurose plastic and the like.

Preferred embodiments of the present invention will now be described.

| First embodiment | |
| --- | --- |
| silicon oxide | 45 weight % |
| felspar oxide | 9 weight % |
| borax | 18.48 weight % |
| boric acid | 6 weight % |
| potassium carbonate | 4 weight % |
| nitre | 1.2 weight % |
| aluminum hydroxide | 6.8 weight % |
| limestone | 1.8 weight % |
| barium carbonate | 1 weight % |
| lithium | 0.8 weight % |
| zircon | 1.3 weight % |
| phosphoric acid | 0.4 weight % |
| carbon | 3.5 weight % |
| magnesium carbonate | 0.5 weight % |
| color fixing agent | 0.22 weight % |

A mixture of above ingredients is agitated by a stirrer having a rotative velocity of 33 rpm for 0.5–1 hour, mixed, put into a glass dissolving furnace and fused for 19–21 hours under a high temperature of 1,350–1,550 degrees celsius to thereby obtain a far infrared ray emitting material.

Said material is now extruded to have a disc-shaped far infrared ray emitting product having a thickness of 5 mm with a radius of 50 mm.

Said product thus manufactured emits a far infrared ray having a wavelength of 0.26 µm–1,000 µm.

| Second embodiment | |
| --- | --- |
| silicon oxide | 50 weight % |
| felspar oxide | 7 weight % |
| borax | 20 weight % |
| boric acid | 5 weight % |
| potassium carbonate | 3 weight % |
| nitre | 1 weight % |
| aluminum hydroxide | 6.3 weight % |
| limestone | 1.4 weight % |
| barium carbonate | 0.8 weight % |
| lithium | 0.7 weight % |
| zircon | 1 weight % |
| phosphoric acid | 0.2 weight % |
| carbon | 3 weight % |
| magnesium carbonate | 0.4 weight % |
| color fixing agent | 0.2 weight % |

A mixture of above ingredients is put into a glass dissolving furnace, and according to the same manufacturing method as in the first embodiment, a disc-shaped far infrared ray emitting product is manufactured with a thickness of 5 mm and a radius of 50 mm.

Said product thus manufactured emits a far infrared ray having a wavelength of 0.26 µm–1,000 µm.

| Third embodiment | |
| --- | --- |
| silicon oxide | 55 weight % |
| felspar oxide | 7 weight % |
| borax | 15 weight % |

| Third embodiment —continued | |
| --- | --- |
| boric acid | 5 weight % |
| potassium carbonate | 3 weight % |
| nitre | 1 weight % |
| aluminum hydroxide | 6.3 weight % |
| limestone | 1.4 weight % |
| barium carbonate | 0.8 weight % |
| lithium | 0.7 weight % |
| zircon | 1 weight % |
| phosphoric acid | 0.2 weight % |
| carbon | 3 weight % |
| magnesium carbonate | 0.4 weight % |
| color fixing agent | 0.2 weight % |

A mixture of above ingredients is put into a glass dissolving furnace, and according to the same manufacturing method as in the first embodiment, a disc-shaped far infrared emitting product is manufactured with a thickness of 5 mm and a radius of 50 mm.

Said product thus manufactured emits a far infrared ray having a wavelength of 0.26 µm–1,000 µm.

| Fourth embodiment | |
| --- | --- |
| silicon oxide | 65 weight % |
| felspar oxide | 7 weight % |
| borax | 10 weight % |
| boric acid | 4 weight % |
| potassium carbonate | 2 weight % |
| nitre | 1 weight % |
| aluminum hydroxide | 3.3 weight % |
| limestone | 1.4 weight % |
| barium carbonate | 0.8 weight % |
| lithium | 0.7 weight % |
| zircon | 1 weight % |
| phosphoric acid | 0.2 weight % |
| carbon | 3 weight % |
| magnesium carbonate | 0.4 weight % |
| color fixing agent | 0.2 weight % |

A mixture of above ingredients is put into a glass dissolving furnace, and according to the same manufacturing method as in the first embodiment, a disc-shaped far infrared emitting product is manufactured with a thickness of 5 mm and a radius of 50 mm.

Said product thus manufactured emits a far infrared ray having a wavelength of 0.26 µm–1,000 µm.

Fifth Embodiment

The far infrared ray emitting material maunfactured according to the first embodiment is pulverized by way of a ball mill, pulverizer or the like into powder. The powdered far infrared ray emitting material and resin grains as extruding material are mixed in the ratio of 150 grams against 1,000 grams, so that a disc-shaped opaque far infrared ray emitting product can be manufactured by an extruder, having a thickness of 5 mm and a radius of 30 mm.

Because the far infrared ray emitting material thus manufactured contains resin component, it is opaque and resilient and won't break even though free-failed from a 5 m height.

Other characteristics thereof are the same as the test results of the first embodiment.

Sixth Embodiment

The far infrared ray emitting material thus manufactured according to the second embodiment is pulverized by a ball mill, a pulverizer or the like to thereafter be made into powder, and the far infrared ray emitting powder of 150 grams is mixed with resin grain of 1,000 grams as extruded material, to thereby manufacture a disc-shaped far infrared ray emitting product having a thickness of 5 mm and a radius of 30 mm by way of an extruder.

Because the far infrared ray emitting material thus manufactured contains resin component, it has an opaqueness and a resilience, so that it won't break even though it is free-failed from a 5 mm height.

Other characteristics of the sixth embodiment are the same as the test results of the first embodiment.

Seventh Embodiment

The far infrared ray emitting material thus manufactured according to the third embodiment is pulverized by a ball mill, a pulverizer or the like to thereafter be made into powder, and the far infrared ray emitting powder of 150 grams is mixed with resin grain of 1,000 grams as extruded material, to thereby manufacture a disc-shaped far infrared ray emitting product having a thickness of 5 mm and a radius of 30 mm by way of an extruder.

Because the far infrared ray emitting material thus manufactured contains resin component, it has an opaqueness and a resilience, so that it won't break even though it is free-failed from a 5 mm height.

Other characteristics of the seventh embodiment are the same as the test results of the third embodiment.

Germ cultivating experiment and hemostatic experiment are performed on the far infrared ray emitting material (or product) thus manufactured.

General Germ Cultivating Experiment

Sample of the general germ cultivating experiment is supernatant water obtainable from earth collected from the nature, put into faucet water, stirred for one hour in an agitator and left for 24 hours.

Sample was collected five times from the supernatant water, and number of general germs was counted, which yielded 1,115 on the average.

Next, the supernatant water of 100 cc was poured into five respective beakers and the same were inserted by the disc-shaped far infrared ray emitting material having a thickness of 5 mm and a radius of 50 mm according to the present invention, and sealed. After 60 minutes, sample was collected from five respective beakers and number of general germs was counted. The number of the germs was 680 on the average by way of arithmetic mean.

As noticed from the experiments, it should be apparent that the far infrared ray emitting material has an action of suppressing or keeping under control the cultivation of the general germs.

Hemostatic Experiment

A hand was cut by a knife once every day at a 7-day interval and the far infrared ray emitting material (or product) was applied to the cut area of the hand, and the bleeding was stopped within 30 seconds.

Conversely, when the hand was cut once every day at a 7-day interval and was left without treatment, time necessary for stopping bleeding required for more than 60 seconds on the average.

As noticed in the experiment results, it should be apparent that the far infrared ray emitting material (or product) has an action of stopping bleeding.

As apparent from the foregoing, the far infrared ray emitting material (or product) according to the present invention can emit a far infrared ray of a strong wavelength having 0.26–1,000 µm, so that, when a disc-shaped or other-shaped product made out of the far infrared ray emitting material is administered to an affected area of a human body, curing of the human foot, pain or the like can be quickened by promoted circulation of blood caused by vibration generated by wavelength of the far infrared ray emitted from the product after elapse of a predetermined period of time, and at the same time, odor and pain therefrom due to the human foot can be removed.

Furthermore, when a tablet is prepared out of the far infrared ray emitting material according to the embodiments of the present invention in a shape a long round rod having a radius of 3 mm and a length of 20 mm, and is held in the mouth, an erruption of the tongue and mouth odor can be removed, and pain relieving effect can be worked on the pain from toothache, and bleeding by cut wounds by way of the knife or the like can be immediately stopped by contact with or application of the disc-shaped or tableted far infrared ray emitting material.

Meanwhile, a necklace, pendant or the like using the tablet manufactured by the far infrared ray emitting material according to the present invention can stabilize blood pressure for a patient who is suffering from the high blood pressure, when the same is worn at the neck by the patient, and fatigue can be relieved by the pendant or the like using the tablet manufactured by the far infrared ray emitting material according to the present invention.

Still furthermore, when a cup of coffee is dipped by the far infrared ray emitting material (or product) according to the present invention, and is tasted, a drinker can enjoy a caffeine-free and deep flavored coffee because the molecular arrangement of the caffeine component contained in the coffee is changed.

Still furthermore, when the far infrared ray emitting material (or product) is placed on the cigarette for 1–5 minutes and smoked, a smoker can enjoy a cigarette of less nicotine for maintaining a better health because molecular arrangement of the nicotine components is changed.

Although the above description has explained about a representative disc-shaped far infrared ray emitting product having a thickness of 5 mm and a radius of 50 mm, it is not intended to limit the scope of the invention.

By way of example, it should be apparent that the shape of the same can come in various shapes such as rod shape, ring shape, circular shape, button shape and the like.

Although the foregoing description of the preferred embodiments have been presented for the purpose of illustration and description, it is not intended to limit the scope of the present invention, and it will be understood by one of ordinary skill in the art that various modifications can be made without departing from the spirit and scope of the invention.

What is claimed is:

1. A manufacturing method for a far infrared ray emitting material comprising the steps of:

agitating a predetermined quantity of materials for ½–1 hour with a stirrer having a rotative speed of 33 revolutions per minute in a mixing vessel; and fusing the agitated materials in a glass dissolving furnace at 1,350–1,550 degrees Celsius for 19–21 hours;

said predetermined quantity of materials comprising:

silicon oxide of 45–65%, weight, felspar oxide of 7–9% weight, borax of 10–20% weight, boric acid of 4–6% weight, potassium carbonate of 2–4% weight, nitre of 1.0–1.2% weight, aluminum hydroxide of 3.3–6.8%, weight limestone of 1.4–1.8% weight, barium carbonate of 0.8–1.0%, weight, lithium of 0.7–0.8% weight, zircon of 1.0–1.3% weight, phosphoric acid of 0.2–0.4% weight, carbon of 3.0–3.5% weight, magnesium carbonate of 0.4–0.5% weight and color fixing agent of 0.2–0.22% weight.

2. The manufacturing method for a far infrared ray emitting material as defined in claim 1, wherein the material is formed according to a predetermined shape in a mold.

3. A manufacturing method for a far infrared ray emitting material comprising the steps of:

agitating a predetermined quantity of materials for ½–1 hour with a stirrer having a rotative speed of 33 revolutions per minute in a mixing vessel; and fusing the agitated materials in a glass dissolving furnace at 1,350–1,550 degrees Celsius for 19–21 hours;

immersing the fused materials in cold water;

pulverizing the fused materials into finely disintegrated powdered materials; and combining the powdered materials with a resin grain in the ratio of 150 grams of powdered material to 1000 grams of resin grain;

said predetermined quantity of materials comprising:

silicon oxide of 45–65% weight, felspar oxide 7–9% weight, borax of —10–20% weight, boric acid of 4–6% weight, potassium carbonate of 2–4% weight nitre of 1.0–1.2% weight, aluminum hydroxide of 3.3–6.8% weight, limestone of 1.4–1.8% weight, barium carbonate of 0.8–1.0% weight, lithium of 0.7–0.8% weight, zircon of 1.0–1.3% weight, phosphoric acid of 0.2–0.4% weight, carbon of 3.0–3.5% weight, magnesium carbonate of 0.4–0.5% weight and color fixing agent of 0.2–0.22% weight.

4. The manufacturing method for a far infrared ray emitting material as defined in claim 3, wherein the resin grain is replaced by silicon rubber.

5. The manufacturing method for a far infrared my emitting material as defined in claim 3 further comprising the step of extruding the combined powdered material and resin grain into a predetermined shape.

* * * * *

UNITED STATES PATENT AND TRADEMARK OFFICE
CERTIFICATE OF CORRECTION

PATENT NO. : 5,643,489
DATED : July 1, 1997
INVENTOR(S) : Sung-Jun JONG

It is certified that error appears in the above-identified patent and that said Letters Patent is hereby corrected as shown below:

On the title page item [76], should read

-- Sung-Jun JONG
343-13, Namjeong-li, Shindun-myeon
Leecheon-kun
Kyungki-do, Republic of Korea --.

On the title page item [30],

"Foreign Application Priority Data" should read --
Feb. 14, 1995 (KR) Republic of Korea 95-2703 --.

Signed and Sealed this

Seventeenth Day of August, 1999

Attest:

Q. TODD DICKINSON

*Attesting Officer*   *Acting Commissioner of Patents and Trademarks*